Feb. 15, 1966    H. M. HANSEN    3,235,128
COLLAPSIBLE TUBE
Filed Dec. 20, 1963    2 Sheets-Sheet 1
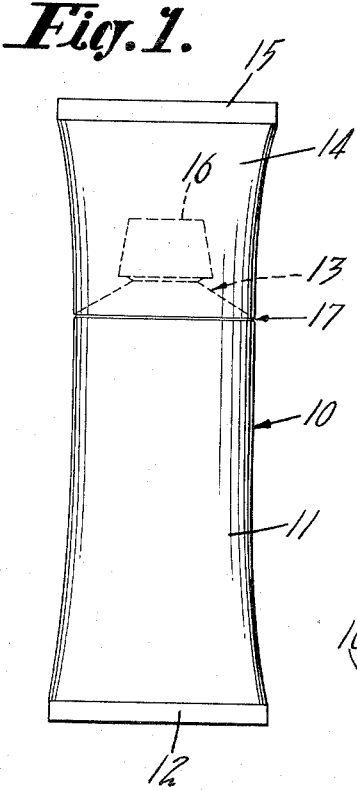
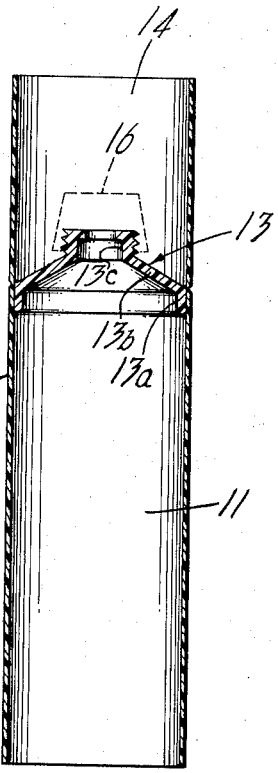
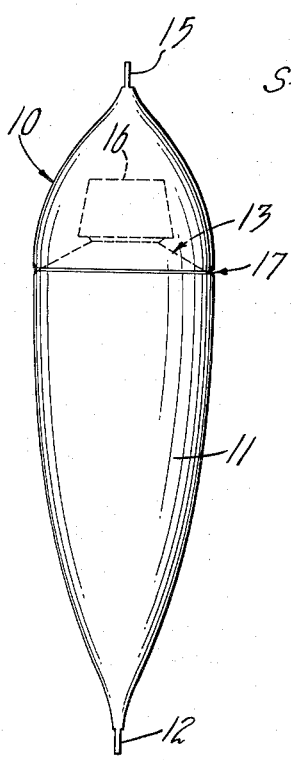
INVENTOR.
HAROLD MILTON HANSEN
BY Louis H. Heef
ATTORNEY

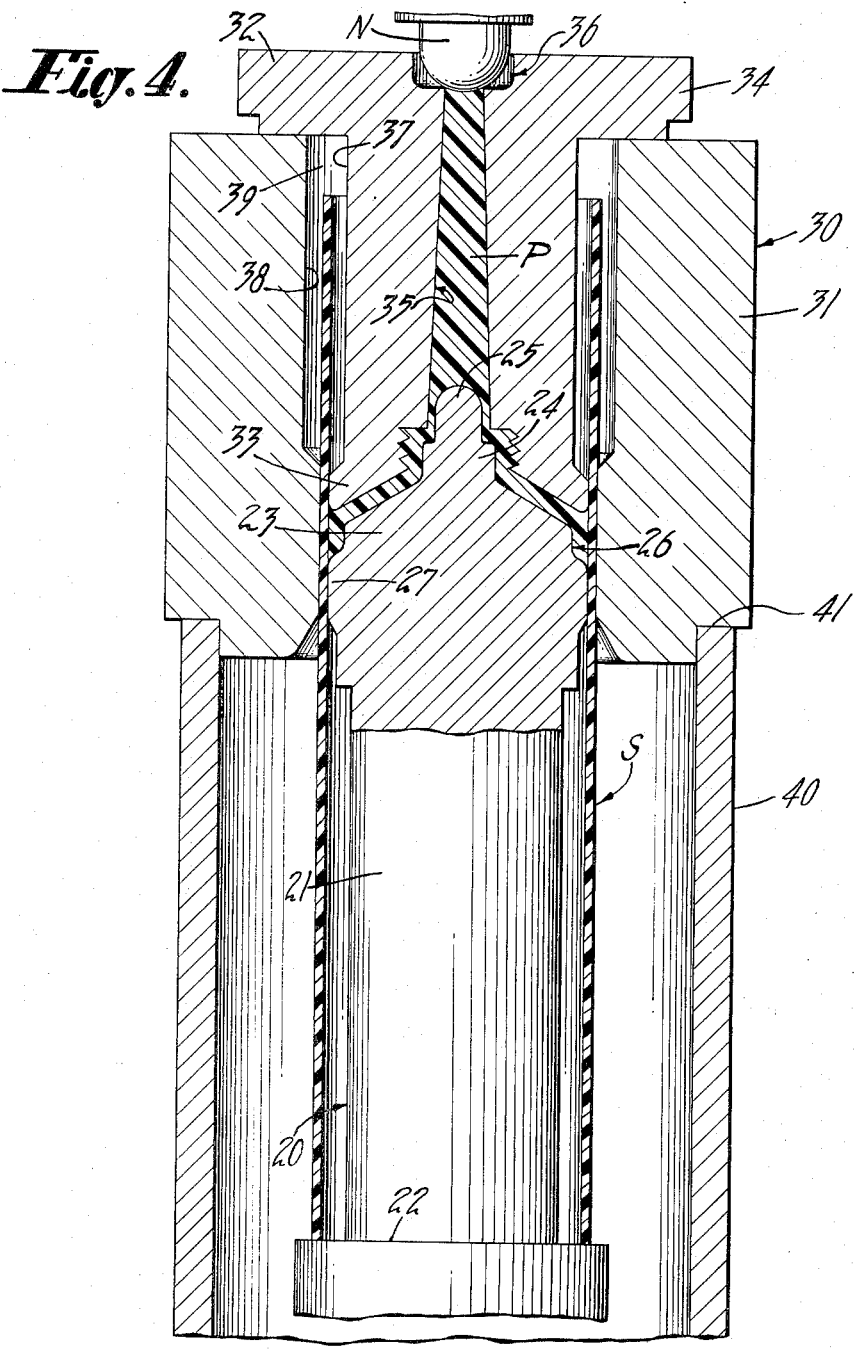

United States Patent Office 3,235,128
Patented Feb. 15, 1966

3,235,128
COLLAPSIBLE TUBE
Harold Milton Hansen, Summit, N.J., assignor to American Can Company, New York, N.Y., a corporation of New Jersey
Filed Dec. 20, 1963, Ser. No. 332,144
5 Claims. (Cl. 222—107)

This invention relates to a dispensing container of the type known as a collapsible tube. My invention is particularly directed to a tube construction, of thermoplastic material or a lamination comprising thermoplastic material, which includes an upper sealed chamber enclosing the headpiece and closure normally affixed to the top end of the tube in addition to the tubular body which receives the contained product.

Collapsible squeeze tubes per se are not new. In fact, with the great advancements in plastics technology since the late 1940's, the plastic squeeze tube has become a commonplace container for packaging a wide variety of household products including detergents, cosmetics, comestibles, toiletries, etc. Because of its stability, economics and compatibility with many products, polyethylene has been the leading material in squeeze tube manufacture. Polyethylene has the disadvantage, however, of being permeable to certain oils, oxygen and other gases and ingredients found in the liquid and paste forms of many of the products of today, necessitating the use of barrier coatings or films to render tubes of this material satisfactory as a container.

One technique has been to interiorly coat the tube with a thin coating of fluid-proof material. Another is to prepare the tube body from a lamination, usually comprising one or more plies of a barrier material such as metallic foil bonded to or intermediately of several plies of polyethylene or other polyolefin materials. To date, however, no satisfactory way has been found within the practical standards of production economics to ensure one hundred percent impermeability. This is because the headpiece which closes the top end of the tube, usually molded of the same or similar polyolefin material as used in the body, also is permeable to an extent only somewhat less than the body wall. Providing this headpiece with a barrier film, either in the form of a coating or a built-in barrier ply, is expensive and not always practicable or completely effective. Consequently, the plastic squeeze tube has not been a popular container for packaging certain products requiring near perfect conditions of sterility, such as baby food formula products and pharmaceuticals, to name just a few of the more important ones.

An important object, therefore, of the instant invention is to provide a collapsible tube capable of providing a completely sterile pack.

Another object of this invention is to provide a collapsible tube of laminated tubular construction with means to ensure complete sterility of the contents.

Still another object of this invention is to provide a collapsible tube having the usual tubular body and headpiece with the addition of integral, severable means enclosing the headpiece to ensure complete sterility of the contents.

Yet another object of this invention is to provide a squeeze tube capable of providing a completely sterile pack and of a construction which is inexpensive and lends itself to economical, high-speed fabrication.

These and other objects will become apparent from the following description which, taken in connection with the drawings and appended claims, discloses the novel features of a preferred form of this invention.

Referring to the drawings:

FIGURE 1 is a side elevational view of a collapsible tube incorporating the novel features of this invention, shown as it appears when filled with a product and both ends sealed.

FIGURE 2 is an end elevational view of this tube.

FIGURE 3 is a sectional elevational view of the tube as it appears before filling and end sealing.

FIGURE 4 is an enlarged view, partly in section, of one form of apparatus used in fabricating the tube of FIGURE 3, depicting the step of forming the headpiece of the tube and uniting it to the tube body.

The collapsible tube of this invention, illustrated generally by the numeral 10, comprises a tubular body portion 11 which is adapted to be closed at the bottom end by the usual heat seal 12 to contain the product therein, a headpiece generally designated 13 united to the upper end of body portion 11, and a shroud portion 14 enclosing the headpiece and adapted to be sealed at its upper end as at 15.

Headpiece 13 comprises an annular flange portion 13a which unites with the inner wall of the upper end of body 11, a generally tapered breast portion 13b and an apertured neck portion 13c which may be threaded to receive a screw cap 16 placed thereon prior to forming shroud seal 15. The headpiece is of molded construction, preferably of a thermoplastic material like or similar to that of body 11, and is molded in place in the manner illustrated in FIGURE 4 so that flange portion 13a completely fuses with inner wall of the body and forms therewith a durable, leak-proof seam.

Body portion 11 and shroud portion 14 preferably are but two distinct portions of a common sleeve or length of tubing generally designated S. As illustrated for the sake of simplicity in the drawings, this unitary sleeve S may be all plastic material, such as polyethylene, polyvinyl chloride, polyvinylidene chloride, etc., in which case it is cut to length from a continuous extrusion. However, sleeve S may be a lamination comprising a multiplicity of plies, including a barrier ply such as metallic foil, in which case it is fabricated from a blank cut to size and formed into tubular shape with a longitudinal side seam (not shown).

Body portion 11 and shroud portion 14 of the unitary element S are set off as distinct and separable portions by a severance or score line 17 encircling headpiece 13 at or contiguous the shoulder of the headpiece where flange portion 13a and breast portion 13b merge. Score line 17 may be formed in the outer surface of sleeve S before or after forming of the headpiece 13, whichever is preferred. This line of severance enables the consumer to easily remove the shroud portion 14 simply by gripping body portion 11 and twisting the shroud portion until it completely severs from the headpiece, thereby giving access to closure cap 16. The severed shroud may then be discarded, leaving a collapsible tube package of conventional configuration from which the contents may be consumed as desired. Other means are envisaged for providing easy removal of shroud 14 from the tube. This may take the form of an integral tear strip defined by parallel score lines encircling headpiece 13, or body portion 11 and shroud portion 14 may be separate pieces joined in abutting relation by a removable tape seal encircling the headpiece around the line of abutment.

The apparatus depicted in FIGURE 4 is exemplary of the type of equipment by which tube 10 may be fabricated. It comprises a mandrel or male tool generally designated 20 on which sleeve S is positioned and a die generally designated 30 into which the mandrel and sleeve are placed to mold headpiece 13 to the sleeve.

Mandrel 20 includes a stem 21 connected to an enlarged base 22 which may be reciprocably supported on an actuating mechanism (not shown) for moving the mandrel into and out of the die 30. The upper end of the mandrel is provided with a tapered face portion 23 and neck portion 24 which define the inner surfaces of a cavity in which headpiece 13 is formed. A small tip portion 25 projects upwardly from neck portion 24 to define an aperture in the neck portion of the headpiece. The face portion 23 of the mandrel is undercut, as at 26, to provide an annular cavity space for the formation of flange portion 13a of the headpiece. The mandrel is at its greatest diameter just below the undercut 26 where a narrow annular band portion 27 provides the surface for engaging the inner wall of sleeve S and supporting it on the mandrel in proper alignment.

Die 30 comprises an outer ring member 31 and an inner plug member 32. Ring member 31 encloses the upper portion of sleeve S and tightly engages the sleeve in the region of and immediately above and below where flange portion 13a of the headpiece will be united to the inside wall of the sleeve. To facilitate opening and closing the mold assembly, the ring member preferably is segmented or bipartite and mounted to an actuating mechanism (not shown) for moving it into and from its closed position illustrated in FIGURE 4.

Plug member 32 includes an annular inner end portion 33 which tightly engages the inner wall of sleeve S just above undercut 26 and is interiorly configured to define the upper surfaces of the cavity in which headpiece 13 is formed. The outer end of the plug member is provided with a flange 34 which seats against the upper end of outer ring member 31 and properly positions the inner end portion 33 with respect to the face of mandrel 20. Plug member 32 is centrally passaged, as at 35, to provide the flow passage for molten plastic P which flows from a nozzle N of a supply mechanism (not shown) seated within a recess 36 formed in the upper face of flange portion 34. Preferably, plug member 32 also is segmented to facilitate its retraction away from the molded headpiece without damage to the threads molded integrally with neck portion 13c.

The outer wall 37 of the plug member between flange portion 34 and inner end portion 33 is undersize with respect to the inside diameter of sleeve S. Similarly, the inside wall 38 of ring member 31 is oversized with respect to the outside sleeve diameter for a distance substantially coincident with plug wall 37. This provides an annular space 39 for receiving the upper portion of sleeve S free of engagement with either member except in that critical region of the headpiece cavity where tight sealing engagement is necessary.

In operation, sleeve S is loaded onto mandrel 20 with the bottom end of the sleeve resting on enlarged portion 22 and its upper end protruding a predetermined distance beyond mandrel face portion 23. The mandrel with the sleeve thereon is then positioned within the segmented ring member 31 of the die, and the plug member is placed within the upper end of the sleeve. A positioner sleeve 40 which moves in unison with the mandrel, and which has an upper end 41 fixed in a predetermined position with respect to the mandrel face, serves to properly locate the elements making up the assembled mold. Ring member 31 rests on end 41 of positioner sleeve 40, and flange portion 34 of the plug member 32 rests against the upper end of the ring member, whereby both die members are positioned with respect to the mandrel face to form the headpiece cavity at the desired position within sleeve S.

Thus assembled, portion 33 of the plug member and portion 27 of the mandrel are tightly engaging the inside wall of the sleeve, and this engagement is backed up by ring member 31 surrounding and tightly engaging this section of the sleeve. The molten plastic P is then forced into the cavity through passage 35 and completely fills this cavity to form headpiece portions 13a, 13b and 13c, the flange portion 13a being fused to the inner wall of sleeve S because of the heat content of the molten plastic. After a brief period for cooling during which the headpiece 13 takes its set, the die members 31 and 32 are retracted and the now unitary tube 10 is removed from the mandrel 20. Cooling passages (not shown) may be provided in the die members to facilitate setting the headpiece, and an air blow-off system (not shown) may be incorporated in the mandrel for removing the finished tube.

It will be understood that the shape of the mold parts hereinabove described for forming headpiece 13 is only exemplary and may be varied to form a headpiece of any desired configuration. Also, while the described system for introducing molten plastic into the mold is preferred, it is envisaged that other equivalent systems, such as compression molding, transfer molding and well known modifications thereof may be used.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. A collapsible tube comprising a tubular body, an end member having a shoulder portion integrally united to the inner wall of one end of said body and a neck with a closure thereon, a shroud projecting outwardly from said end of said body and surrounding said end member, said shroud being severably united to said body at a line of weakness encircling said end member and sealed at its outer end to provide a sterile chamber enclosing said neck with said closure thereon.

2. The collapsible tube of claim 1 wherein said shroud is a continuation of said body and said line of weakness encircles said tube where said shroud and said body unite with said end member.

3. The collapsible tube of claim 1 wherein said shroud and body comprise a tubular unit of oxygen impervious lamination of thermoplastic and metallic foil layers.

4. A collapsible tube comprising a tubular element formed of a single piece of material and a transversal member integrally united to the inner wall of said tubular element a predetermined distance from the ends thereof and separating said tubular element into upper and lower chambers, said transversal member being formed with a shoulder portion and an apertured neck portion extending into said upper chamber and being provided with a closure thereon, said tubular element having a line of weakness encircling said transversal member to facilitate severance of said upper chamber to provide access to said closure, said lower chamber providing a product chamber when sealed at the lower of said ends and said upper chamber providing a sterile chamber enclosing said transversal member with a closure thereon when sealed at the other of said ends.

5. The collapsible tube of claim 4 wherein said tubular element is a lamination including a barrier layer and an inner layer of thermoplastic material, and said transversal member is of thermoplastic material integrally molded to said inner layer.

References Cited by the Examiner

UNITED STATES PATENTS

| | | | |
|---|---|---|---|
| 2,396,635 | 3/1946 | Bogoslowsky | 222—107 |
| 2,628,742 | 2/1953 | Kierulff | 222—106 X |
| 2,682,974 | 6/1954 | Smith | 222—107 |

LOUIS J. DEMBO, *Primary Examiner.*

RAPHAEL M. LUPO, *Examiner.*